(12) United States Patent
Baldwin et al.

(10) Patent No.: US 7,781,002 B2
(45) Date of Patent: Aug. 24, 2010

(54) MINERAL COMPLEXES OF LACTOBIONIC ACID AND METHOD OF USING FOR MINERAL FORTIFICATION OF FOOD PRODUCTS

(75) Inventors: Cheryl Baldwin, Mundelein, IL (US); Ahmad Akashe, Mundelein, IL (US); Bary Lyn Zeller, Glenview, IL (US); Manuel Marquez-Sanchez, Lincolnshire, IL (US); Rathna Koka, Mt. Prospect, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 0 days.

(21) Appl. No.: 11/536,498

(22) Filed: Sep. 28, 2006

(65) Prior Publication Data

US 2007/0026110 A1    Feb. 1, 2007

Related U.S. Application Data

(63) Continuation of application No. 10/377,541, filed on Feb. 28, 2003, now abandoned.

(51) Int. Cl.
*A23L 1/304* (2006.01)
(52) U.S. Cl. .......................... 426/74; 426/648; 426/658
(58) Field of Classification Search ........................ None
See application file for complete search history.

(56) References Cited

U.S. PATENT DOCUMENTS

| | | | |
|---|---|---|---|
| 2,856,327 A | * | 10/1958 | Shaw et al. .................. 514/53 |
| 3,769,176 A | * | 10/1973 | Hise et al. ................. 435/293.1 |
| 4,642,238 A | | 2/1987 | Lin et al. |
| 4,673,583 A | | 6/1987 | Kuwata et al. |
| 4,701,329 A | | 10/1987 | Nelson et al. |
| 4,737,375 A | | 4/1988 | Nakel et al. |
| 4,740,380 A | | 4/1988 | Melachouris et al. |
| 4,784,871 A | | 11/1988 | Park |
| 4,840,814 A | | 6/1989 | Harada et al. |
| 4,851,221 A | | 7/1989 | Pak et al. |

(Continued)

FOREIGN PATENT DOCUMENTS

EP    0 515 110 A2    11/1992

(Continued)

OTHER PUBLICATIONS

Kristina L. Penniston et al., "Quantitative Assessment of Citric Acid in Lemon Juice, Lime Juice, and Commercially-Available Fruit Juice Products", J Endourol. Mar. 2008; vol. 22, issue 3, pp. 567-570.

(Continued)

*Primary Examiner*—Helen F Pratt
(74) *Attorney, Agent, or Firm*—Fitch, Even, Tabin & Flannery (57) ABSTRACT

Mineral complexes, especially calcium complexes, of lactobionic acid which are especially useful for mineral fortification of food and beverage products are provided. The preferred calcium complex of lactobionic acid provided in the present invention delivers a soluble, stable, clean tasting calcium source suitable for calcium fortification of a wide variety of food and beverage products. The mineral complexes are prepared by mixing lactobionic acid, a mineral source, (e.g., mineral hydroxide), and an edible acid (e.g., citric acid) in an aqueous solution.

18 Claims, 4 Drawing Sheets

A

U.S. PATENT DOCUMENTS

| | | | |
|---|---|---|---|
| 4,851,243 A | 7/1989 | Andersen et al. | |
| 4,871,554 A | 10/1989 | Kalala et al. | |
| 4,906,482 A | 3/1990 | Zemel et al. | |
| 4,992,282 A | 2/1991 | Mehansho et al. | |
| 5,075,499 A | 12/1991 | Walsdorf et al. | |
| 5,186,965 A | 2/1993 | Fox et al. | |
| 5,208,372 A | 5/1993 | Vidal et al. | |
| 5,215,769 A | 6/1993 | Fox et al. | |
| 5,219,602 A | 6/1993 | Saleeb et al. | |
| 5,290,766 A | 3/1994 | Choong | |
| 5,397,589 A | 3/1995 | Korte et al. | |
| 5,449,523 A | 9/1995 | Hansen et al. | |
| 5,478,587 A | 12/1995 | Mingione | |
| 5,514,387 A | 5/1996 | Zimmerman et al. | |
| 5,597,596 A | 1/1997 | Henderson | |
| 5,690,975 A | 11/1997 | Akahoshi et al. | |
| 5,780,081 A | 7/1998 | Jacobson et al. | |
| 5,820,903 A | 10/1998 | Fleury et al. | |
| 5,834,045 A | 11/1998 | Keating | |
| 5,840,354 A | 11/1998 | Baumann et al. | |
| 5,851,578 A | 12/1998 | Gandhi | |
| 5,855,936 A | 1/1999 | Reddy et al. | |
| 5,897,892 A | 4/1999 | Jolivet et al. | |
| 5,928,691 A | 7/1999 | Reddy et al. | |
| 5,945,144 A | 8/1999 | Hahn et al. | |
| 6,007,852 A | 12/1999 | Reinbold et al. | |
| 6,036,985 A | 3/2000 | Jacobson et al. | |
| 6,106,874 A | 8/2000 | Liebrecht et al. | |
| 6,235,322 B1 | 5/2001 | Lederman | |
| 6,916,496 B2 * | 7/2005 | Koka et al. | 426/39 |
| 2002/0122866 A1 | 9/2002 | Palaniappan et al. | |
| 2006/0251765 A1 | 11/2006 | Lederman | |

FOREIGN PATENT DOCUMENTS

| | | |
|---|---|---|
| EP | 0 875 153 A2 | 11/1998 |
| GB | 597936 A | 2/1948 |
| GB | 2129821 A | 5/1984 |
| JP | 7-277991 | 10/1995 |
| WO | 88/03762 A1 | 6/1988 |
| WO | 2002/069743 A2 | 9/2002 |
| WO | WO 02/089592 | 11/2002 |

OTHER PUBLICATIONS

Intestinal Calcium Absorption in Rats Is Stimulated by Dietary Lactulose and Other Resistant Sugars, Robert Brommage, Claudine Binacua, Simone Antille, and Anne-Lise Carrie, Nutrient Requirements and Interactions, vol. 123., 1993, pp. 2186-2194.

Calcium in Food Fortification Strategies, C.M. Weaver, International Dairy Federation, 1998, pp. 108-116.

Study of the Lactone-Acid Salt Equilibria & the Hydrolysis Kinetics for Lactobionic-delta-lactone, Dutta, S.K. and Mukherjee, S.K., Indian Journal of Chemistry, vol. 9, pp. 229-232, Mar. 1971.

Effects of Cation Interactions on Sugar Anion Conformation in Complexes of Lactobionate and Gluconate with Calcium, Sodium or Potassium., M.W. Wieczorek, J. Blaszczyk and B.W. Krol, Acta Cryst. C52, pp. 1193-1198, 1996.

* cited by examiner

MINERAL COMPLEXES OF LACTOBIONIC ACID AND METHOD OF USING FOR MINERAL FORTIFICATION OF FOOD PRODUCTS

CROSS REFERENCE TO RELATED APPLICATION

This application is a continuation of U.S. application Ser. No. 10/377,541, filed Feb. 28, 2003, now abandoned, which is incorporated by reference in its entirety.

FIELD OF THE INVENTION

The present invention generally relates to mineral complexes, especially calcium complexes, of lactobionic acid which are especially useful for mineral fortification of food and beverage products. The calcium complex of lactobionic acid provided in the present invention delivers a soluble, stable, clean tasting calcium source suitable for calcium fortification of a wide variety of food and beverage products.

BACKGROUND OF THE INVENTION

Food products manufactured for public consumption are often modified by adding nutritional or other types of additives in order to enhance their nutritional properties. Nutritional fortification of food products may include additives that benefit the overall state of health of the human body. Examples of nutritional fortification include addition of vitamins, minerals, and comparable materials. These additives are either absolutely essential for human metabolism or enhance the provision of substances that may not be available in sufficient amounts in a normal diet.

In recent years, calcium fortification of foods and beverages has received significant attention. Calcium fortification and increased calcium intake is reported to be especially useful in the prevention or moderating the effects of osteoporosis. Increased dietary intake of calcium has been shown to be effective in minimizing bone loss in adults and the elderly. Moreover, increased consumption of calcium earlier in life may build reserves that enable a greater tolerance of a negative calcium balance in later years. Increased consumption of calcium, regardless of age, is expected to mitigate or delay the effects of osteoporosis. Thus, persons of all ages could benefit from increased calcium consumption. Unfortunately, many of the people in greatest need of calcium, including children, women, and the elderly, do not consume the recommended daily levels of calcium. For example, according to United States Department of Agriculture surveys, as many as nine out of ten women in the United States do not consume the recommended levels of calcium. And the elderly often have difficulty in increasing their calcium consumption due to decreasing appetites and metabolism. In addition to bone health, recent research suggests the importance of calcium in improving colon health, weight management, and other health issues.

A large number of calcium compounds or salts have been used to fortify food products. Calcium salts which have been suggested for use or have been used as food supplements include, for example, calcium pyrophosphate, calcium hexametaphosphate, monobasic calcium phosphate, calcium glycerophosphate, tricalcium phosphate, calcium acetate, calcium ascorbate, calcium citrate, calcium citrate malate, calcium carbonate, calcium gluconate, calcium lactate, calcium lactate gluconate, calcium malate, calcium oxide, calcium hydroxide, calcium sulfate, calcium tartrate, dicalcium citrate lactate, calcium fumarate, and calcium chloride.

These calcium supplements have been used in a wide variety of food products. For example, U.S. Pat. No. 4,784,871 (Nov. 15, 1988) provided a calcium fortified yogurt. According to the patent, any calcium compound which is acid soluble could be used. U.S. Pat. No. 5,449,523 (Sep. 12, 1995) and U.S. Pat. No. 5,820,903 (Oct. 13, 1998) also provided calcium-enriched yogurts. U.S. Pat. 5,478,587 (Dec. 27, 1995) provided calcium-enriched deserts.

U.S. Pat. No. 5,834,045 (Nov. 10, 1998) provided calcium fortified acid beverages. This patent reported that the use of a calcium source comprising calcium hydroxide and calcium glycerophosphate with any acidulant will result in a beverage product having a marked improvement in storage stability. U.S. Pat. No. 5,855,936 (Jan. 5, 1999) provided a blend of calcium salts balanced with soluble and insoluble salts which are stabilized with a source of glucuronic acid. This composition is capable of fortifying milk beverages and other dairy-based products without coagulation and sedimentation, and with improved palatability. The calcium salts must be stabilized with the glucuronic acid source. Other calcium sources could optionally be included. Other calcium-enriched beverages are disclosed in, for example, U.S. Pat. No. 4,642,238 (Feb. 10, 1987; dietary and nutritionally balanced drinks); U.S. Pat. No. 4,701,329 (Oct. 20, 1987; milk); U.S. Pat. No. 4,737,375 (Apr. 12, 1988; carbonated and non-carbonated beverages containing solublized calcium and specific amounts of citric acid, malic acid, and phosphoric acid as determined from specific ternary diagrams provided therein); U.S. Pat. No. 4,740,380 (Apr. 26, 1988; soft drinks); U.S. Pat. No. 4,871,554 (Oct. 3, 1989; fruit drink); U.S. Pat. No. 4,851,243 (Jul. 25, 1989; milk); U.S. Pat. No. 4,840,814 (Jun. 20,-1989; milk); U.S. Pat. No. 4,906,482 (Mar. 6, 1990; soy milk); U.S. Pat. No. 5,397,589 (Mar. 14, 1995; milk); U.S. Pat. No. 5,690,975 (Nov. 25, 1997; fermented milk); U.S. Pat. No. 5,597,596 (Jan. 28, 1997; low pH beverage); U.S. Pat. No. 5,780,081 (Jul. 14, 1998; milk); U.S. Pat. No. 5,928,691 (Jul. 27, 1999; milk); and U.S. Pat. No. 5,897,892 (Apr. 27, 1999; milk base products).

U.S. Pat. No. 4,673,583 (Jun. 16, 1987) provided a calcium-enriched soy bean curd. U.S. Pat. No. 5,215,769 (Jun. 1, 1993) provided sauces and salad dressings containing a soluble calcium source comprising specific molar ratios of calcium citrate malate or calcium acetate. U.S. Pat. No. 5,514,387 (May 7,1996) provided calcium enriched crackers and other baked goods; an emulsifier was used to avoid adverse effect on texture and mouthfeel. U.S. Pat. No. 5,840,354 (Nov. 24, 1998) provided calcium-enriched dried fruit products. U.S. Pat. No. 5,945,144 (Aug. 31, 1999) provided a calcium fortified pasta product.

U.S. Pat. No. 5,075,499 (Dec. 24, 1991) provides dicalcium citrate-lactate for use as a calcium supplement. Tablets of dicalcium citrate-lactate were preferably taken on a daily basis. U.S. Pat. No. 6,007,852 (Dec. 28, 1999) relates to a calcium enriched natural cheese. The preferred calcium source is tricalcium phosphate. The patent indicates that other calcium sources (but does not specifically mention any specific sources) can be used so long as the calcium source forms a suspension rather than a solution in water, skim milk, or cheese milk. U.S. Pat. No. 6,106,874 (Aug. 22, 2000) provides a low pH nutritional beverage which uses pectin-free fruit juice and a calcium source selected from the group consisting of natural milk mineral concentrate, calcium lactate gluconate, and mixtures thereof.

Calcium sulfate has been found to significantly and adversely affect the organoleptic properties of food products to which it is added. Generally, added calcium sulfate results in bitterness and undesirable strong flavors with added at significant levels. See, e.g., U.S. Pat. Nos. 5,820,903 and 5,840,354. Tricalcium phosphate, although widely used, often contributes an undesirable "gritty" texture which, of course, limits the levels at which it can be incorporated in food products. See, e.g., U.S. Pat. No. 5,449,523.

Calcium enrichment or fortification can adversely affect the organoleptic properties of the food or beverage product to which it is added. Examples of such unacceptable properties include off-flavors, flavor changes, off-colors, textural changes, and the like. Some calcium compounds have more adverse effects than others, especially at higher levels of calcium addition. Thus, much of the currently available technology related to calcium addition does not provide the high levels of calcium addition desired. Further, the cost of some calcium forms is high and, thus, limits their usefulness. Thus, it is desirable to provide additional calcium compounds and/or other dietary minerals for use in food and beverage products which can provide significant levels of dietary calcium or other dietary minerals without adverse effects on organoleptic properties and at lower cost. Additionally, the form of calcium can influence absorption and use by and in the body. Additionally, the absorption of calcium can be enhanced or inhibited by other compounds. For example, some carbohydrates can improve calcium absorption. Greger, "Nondigestible Carbohydrates and Mineral Bioavailability," *J. Nutr.*, 129, 1434S-1435S (1999); Weaver, "Calcium in Food Fortification Strategies," *Internat. Dairy J.*, 8, 443-449 (1998); Brommage et al., "Intestinal Calcium Absorption in Rats Is Stimulated by Dietary Lactulose and Other Resistant Sugars," *J. Nutr.*, 123, 2186-2194 (1993).

Lactobionic acid (4-O-β-D-galactopyranosyl-D-gluconic acid; CAS Reg. No. 96-82-2) is a water soluble, white crystalline compound. It can be synthesized from lactose by oxidation of the free aldehyde group in lactose as carried out catalytically, chemically, electrolytically, or enzymatically. Harju, *Bulletin of the IDF* 289, ch. 6., pp. 27-30, 1993; Satory et al., *Biotechnology Letters* 19 (12) 1205-08, 1997. The use of lactobionic acid or its salts as additives in food products previously has been suggested for several specific applications. Calcium or iron chelate forms of lactobionic acid has been described for dietary mineral supplementation. Riviera et al., *Amer. J. Clin. Nutr.*; 36 (6) 1162-69, 1982. U.S. Pat. No. 5,851,578 describes a clear beverage having a non-gel forming fiber, and water soluble salts of calcium, with or without water soluble vitamins, with or without additional mineral salt supplements and buffered with food acids. The food acid buffering agent includes citric, lactic, maleic, adipic, succinic, acetic, acetic gluconic, lactobionic, ascorbic, pyruvic, and phosphoric acids, as well as combinations thereof. Calcium lactobionate, a salt form of lactobionic acid., has been approved for use as a firming agent in dry pudding mixes. 21 C.F.R. §172.720 (1999). Also, the possible use of lactobionic acid as a general food acidulant has been proposed, albeit without exploration or illustration. Timmermans, *Whey: Proceedings of the 2nd Intl Whey Conf*, Int'l Dairy Federation, Chicago, October 1997, pp. 233, 249. This article generally describes lactobionic acid as being useful as an antibiotics carrier, an organ transplant preservative, mineral supplement, growth promoter of bifidobacteria, or as a co-builder in detergents in its potassium salt form. More recently, the use of lactobionic acid in cheese and other dairy products has been described in copending U.S. patent application Ser. No. PCT US02/14337, filed May 7, 2002, (International Publication WO 02/089592) which is owned by the same assignee as the present application and which is hereby incorporated by reference.

The present invention provides mineral complexes of lactobionic acid which are very effective as mineral fortification agents and which do not significantly affect the organoleptic or textural properties of the food or beverage to which they are added. Such mineral complexes can be produced in a cost effective manner from inexpensive starting materials such as lactose or whey.

SUMMARY OF THE INVENTION

The present invention generally relates to mineral complexes, especially calcium complexes, of lactobionic acid which are especially useful for mineral fortification of food and beverage products. For purposes of this invention, the use of the term "lactobionic acid" also includes its lactone as well as mixtures of the acid and its lactone. (See, e.g., Dutta et al., "Study of the Lactone-Acid-Salt Equilibria and Hydrolysis Kinetics for Lactobionic-Lactone," *Indian J. Chem.*, vol 9, 229-232 (March 1971).) The mineral complexes of the present invention include calcium complexes of lactobionic acid, magnesium complexes of lactobionic acid, potassium complexes of lactobionic acid, sodium complexes of lactobionic acid, iron complexes of lactobionic acid, zinc complexes of lactobionic acid, copper complexes of lactobionic acid, chromium complexes of lactobionic acid, selenium complexes of lactobionic acid, manganese complexes of lactobionic acid, and the like. Mixtures of these mineral complexes may also be used. The mineral complexes of lactobionic acid provided in the present invention delivers a soluble, stable, clean tasting mineral source suitable for mineral fortification of a wide variety of food and beverage products. The high solubility of the mineral complexes of the present invention in water allows for the preparation of mineral-fortification of foods and beverages which are clean tasting and non-gritty. The preferred mineral complex of the present invention is the calcium complex of lactobionic acid.

The mineral complexes of lactobionic acid of the present invention are prepared by mixing lactobionic acid with a mineral source such as mineral hydroxide, mineral carbonate, mineral oxide, or mixtures thereof with an edible acid such as citric acid, lactic acid, acetic acid, malic acid, gluconic acid, tartaric acid, fumaric acid, adipic acid, succinic acid, ascorbic acid, phosphoric acid, or mixtures thereof. Thus, the preferred calcium complex of lactobionic acid of the present invention is prepared by mixing lactobionic acid with a calcium source such as calcium hydroxide, calcium carbonate, calcium oxide, or mixtures thereof with an edible acid such as citric acid, lactic acid, acetic acid, malic acid, gluconic acid, tartaric acid, fumaric acid, adipic acid, succinic acid, ascorbic acid, phosphoric acid, or mixtures thereof. Generally, an aqueous solution containing about 1 to about 95 percent lactobionic acid is mixed with about 1 to about 50 percent of the mineral source (e.g., calcium source) and about 1 to about 50 percent of the edible acid to form the desired mineral complex; generally the pH of the final aqueous solution is about 2 to about 8. More preferably, an aqueous solution containing about 50 to about 90 percent lactobionic acid is mixed with about 5 to about 25 percent of the mineral source (e.g., calcium source) and about 2 to about 20 percent of the edible acid to form the desired mineral complex. An especially preferred calcium complex of lactobionic acid is prepared by mixing lactobionic acid with calcium hydroxide and citric acid.

The present invention is also directed to mineral-fortified food and beverage products containing a mineral complex of lactobionic acid prepared by mixing lactobionic acid with a mineral source such as a mineral hydroxide, mineral carbonate, mineral oxide, or mixtures thereof with an edible acid such as citric acid, lactic acid, acetic acid, malic acid, gluconic acid, tartaric acid, fumaric acid, adipic acid, succinic acid, ascorbic acid, phosphoric acid, or mixtures thereof. Generally, the mineral-fortified food and beverage products of this invention will contain about 0.2 to about 20 percent of the calcium complex of lactobionic acid. Preferably, a single serving of the mineral-fortified food or beverage products of the present invention contain sufficient quantities of the mineral in the form of the corresponding mineral complex of lactobionic to provide about 5 to about 200 percent of the recommended United States Daily Value of calcium, more preferably about 10 to about 35 percent of the recommended United States Daily Value of that mineral. Calcium fortification of food and beverage products using the calcium complex of lactobionic acid of the present invention is especially preferred.

DETAILED DESCRIPTION OF THE INVENTION

The mineral complexes of the present invention are prepared by mixing lactobionic acid, a mineral source, and an edible acid in an aqueous solution. The mineral complexes of the present invention include calcium complexes, magnesium complexes, potassium complexes, sodium complexes, iron complexes, zinc complexes of lactobionic acid and the like. Mixtures of these mineral complexes may also be used. The calcium complex of lactobionic acid is especially preferred. Suitable mineral sources include mineral hydroxides, mineral carbonates, mineral oxides, or mixtures thereof. Generally, the preferred mineral source is the corresponding mineral hydroxide. Suitable edible acids include citric acid, lactic acid, acetic acid, malic acid, gluconic acid, tartaric acid, fumaric acid, adipic acid, succinic acid, ascorbic acid, phosphoric acid, or mixtures thereof. Generally, the preferred edible acid is citric acid.

The mineral complexes of the present invention are sufficiently soluble in food or beverage products to provide at least about 5 percent, and in some cases, depending on the actual product, much higher, of the current United States recommended Daily Value of the mineral per single serving size of the food or beverage product. For purposes of this invention, a single serving size for a food product is about 28 g and for a beverage product is about 240 ml or 8 ounces. For purposes of this invention, the current United States recommended Daily Value of the mineral is considered to be the value published by the United States Food and Drug Administration as of the filing date of the current application. The current United States recommended Daily Value for calcium is 1000 mg per day.

The preferred calcium complex of lactobionic acid of the present invention is prepared by mixing lactobionic acid with a calcium source such as calcium hydroxide, calcium carbonate, calcium oxide, or mixtures thereof with an edible acid such as citric acid, lactic acid, acetic acid, malic acid, gluconic acid, tartaric acid, fumaric acid, adipic acid, succinic acid, ascorbic acid, phosphoric acid, or mixtures thereof. Generally, an aqueous solution containing about 5 to about 95 percent lactobionic acid is mixed with about 1 to about 50 percent of the mineral source (e.g., calcium source such as calcium hydroxide in the preferred embodiment) and about 1 to about 50 percent of the edible acid (e.g., citric acid in the preferred embodiment) to form the desired mineral complex; generally the pH of the final aqueous solution is about 2 to about 8. More preferably, an aqueous solution containing about 50 to about 90 percent lactobionic acid is mixed with about 5 to about 25 percent of the mineral source and about 2 to about 20 percent of the edible acid to form the desired mineral complex. Generally, mixing of the components are carried out at or near room temperature. An especially preferred calcium complex of lactobionic acid is prepared by mixing lactobionic acid with calcium hydroxide and citric acid. Mixed complexes can also be prepared if desired by mixing two or more mineral sources with lactobionic acid and the edible acid. Physical mixtures of two or more separately prepared mineral complexes can also be used.

The mineral complexes of this invention can be prepared by combining the lactobionic acid, mineral source, and edible acid in an aqueous solution. The mineral complex may be maintained as formed in the aqueous solution or may be collected as a solid complex by removing the water medium using any conventional drying technique. Generally it is preferred that the mineral complexes are collected in a solid form; the solid complexes will generally be easier to store and use. Conventional methods can be used to collect the solid mineral complex. Generally, however, gentle methods such as freeze drying, spray drying, drum drying, and the like are preferred to remove the water and obtain the solid mineral complex.

Lactobionic acid is generally a white crystalline powder. Lactobionic acid may be obtained commercially (e.g., Lonza Inc., Fairlawn, N.J.; Sigma, St. Louis, Mo.) or prepared through chemical or enzymatic oxidation of lactose or a lactose-containing substrate. The lactobionic acid can be prepared by saccharide chemical oxidation or bioconversion processes (e.g., catalytic action of a carbohydrate oxidase enzyme) using lactose or a lactose-containing substrate (e.g., whey or whey permeate) as the starting material. Suitable carbohydrate oxidase enzymes include, for example, lactose oxidase, glucose oxidase, hexose oxidase, and the like, as well as mixtures thereof. Generally, lactose oxidase is preferred. A particularly suitable enzyme for lactose oxidation has been developed by Novozymes A/S and is described in Pat. No. WO 9931990, which is hereby incorporated by reference.

Cellobiose dehydrogenase is also a useful enzyme for converting lactose to lactobionic acid. Canevascini et al., *Zeitschtift fur Lebensmiftel Untersuchung und Forschung*, 175: 125-129 (1982). This enzyme is, however, complex and requires the use of a relatively expensive co-factor (e.g., quinones, cytochrome C, Fe(III), and the like); it also requires immobilization. Also, a second enzyme, laccase, is required to regenerate the co-factor used with cellobiose dehydrogenase. The use of glucose-fructose oxidoreductase to oxidize lactose results in two products, sorbitol and lactobionic acid, and a further separation procedure is necessary to recover the lactobionic acid product. Nidetzky et al., *Biotechnology and Bioengineering*, Vol. 53 (1997). Nonetheless, glucose-fructose oxidoreductase also is a suitable enzyme for the practice of this embodiment of the invention. Of course, other methods can be used to prepare the lactobionic acid for use in the present invention.

The mineral complexes of the present invention can be incorporated into various food and beverage products to provide mineral-fortification food and beverage products. Generally, the mineral-fortified food and beverage products of this invention will contain about 0.2 to about 20 percent of the mineral complex of lactobionic acid. Preferably, a single serving of the mineral-fortified food or beverage products of the present invention contain sufficient quantities of the mineral in the form of the corresponding mineral complex of lactobionic to provide about 5 to about 200 percent of the recommended United States Daily Value of calcium (i.e., about 50 to about 2000 mg calcium), more preferably about 10 to about 35 percent of the recommended United States Daily Value of calcium (i.e., about 100 to about 350 mg calcium). Calcium fortification of food and beverage products using the calcium complex of lactobionic acid of the present invention is especially preferred.

Having generally described the embodiments of the process illustrated in the figures as well as other embodiments, the invention will now be described using specific examples which further illustrate various features of the present invention but are not intended to limit the scope of the invention, which is defined in the appended claims. All percentages used herein are by weight, unless otherwise indicated. All patents and other publications referenced herein are hereby incorporated by reference.

EXAMPLE 1. Lactobionic acid crystals (58 g; Lonza Inc., Fairlawn, N.J.) were completely dissolved in 500 g deionized water. Citric acid (6 g; Sigma, St. Louis, Mo.) was then completely dissolved in the solution; calcium hydroxide (10 g; Sigma, St. Louis, Mo.) was then completely dissolved in the solution. The final pH of the calcium complex solution was about 4.6. The aqueous solution was mixed for about 10-30 minutes at room temperature and then freeze dried. About 65 g (about 87 percent yield) of the desired white solid calcium complex containing about 8 percent calcium was obtained. The calcium complex was dissolved in water at room temperature to provide a clear solution with about 2000 mg calcium per single beverage serving size (i.e., about 240 ml or 8 ounces). The calcium complex was more soluble than calcium citrate; it contained more calcium and had better flavor than pure calcium lactobionate available commercially. Thus, the calcium complex better suited in food and beverage applications than other calcium salts or commercially available calcium lactobionate.

EXAMPLE 2. A fortified liquid beverage was prepared using the calcium complex of Example 1. The following formulations were prepared by simply mixing the components together at room temperature:

|  | Inventive (%) | Control (%) |
| --- | --- | --- |
| Calcium Complex | 2.1 | 0 |
| Water | 96.8 | 98.9 |
| Flavor | 0.3 | 0.3 |
| Citric Acid/Malic Acid | 0.5 | 0.5 |
| Colorant | 0.0001 | 0.0001 |
| Preservative (EDTA, sorbate, benzoate, or potassium citrate) | 0.17 | 0.17 |
| Artificial Sweetener (sucralose or acesulfame K) | 0.05 | 0.05 |
| Clouding Agent (Givaudan Flavors Corp.) | 0.06 | 0.06 |

The inventive sample provided about 300 mg calcium per serving (about 240 ml). The control sample was prepared in the same manner as the inventive sample except that it did not contain any of the calcium complex. Samples of the inventive and control samples (20 ml at room temperature) were provided to a trained panel of 17 members in a discrimination sensory test. No significant differences were detected between the inventive and the control samples. Thus, the inventive calcium fortified sample provided a sensory impression essentially identical with the control sample and had no off-flavors, objectionable sensory notes, or textural defects.

EXAMPLE 3. Combinations of calcium lactobionic acid (Sigma, St. Louis, Mo.) with either monocalcium citrate or tricalcium citrate were compared with the calcium complex of Example 1 in similar beverages as described in Example 2 above. The various salts and the calcium complex were added at levels to provide about 1000 mg calcium per single serving. Beverages were prepared containing the following amounts of calcium salts or inventive calcium complex:

| Sample | Calcium Lactobionic Acid (5.3% Ca) | Monocalcium Citrate (9% Ca) | Tricalcium Citrate (21% Ca) | Inventive Calcium Complex (8% Ca) |
| --- | --- | --- | --- | --- |
| Comparative #1 | 15.8 g | 1.8 g | — | — |
| Comparative #2 | 15.8 g | — | 0.76 g | — |
| Inventive | — | — | — | 12.5 g |

Similar water samples containing the above amounts of calcium salts or calcium complex were also prepared. The calcium complex dissolved easily in either the beverage formulation or water to provide a clean tasting, non-gritty beverage. Comparative samples #1 and #2, however, were not completely soluble in either the beverage formulation or water.

EXAMPLE 4. The calcium content of the inventive beverage of Example 2 was increased to provide about 1000 mg calcium (i.e., about 100 percent of the DV of calcium) per 240 ml single serving size. The calcium complex completely dissolved in the beverage. The resulting beverage had acceptable flavor and appearance.

EXAMPLE 5. Beverages as prepared in Examples 2 and 3 containing the inventive calcium complex of Example 1 as well as aqueous solutions containing similar amounts of the calcium complex of Example 1 were stored under refrigerated conditions. Similar levels of conventional calcium sources (e.g., monocalcium citrate, tricalcium citrate, and calcium fumarate) were prepared in aqueous solutions or similar beverages formed noticeable sediments within about 1 week under such storage conditions. No sediments or precipitates were observed in the samples containing the calcium complex of this invention after 7 months of refrigerated storage.

EXAMPLE 6. This examples illustrates several methods of preparing the calcium complex other than the one described in Example 1.

(1) Lactobionic acid (29 g) was dissolved in 250 ml water to which was added calcium hydroxide (5 g) with stirring. Stirring was continued for about 10 minutes, after which citric acid (3 g) was added. Within a few minutes, all solids were completely dissolved. The final pH of the resulting calcium complex solution was about 6.0.

(2) Lactobionic acid (29 g) and citric acid (3 g) were dissolved in water (250 ml). Calcium hydroxide (5 g) was then completely dissolved in the water solution to provide the calcium complex. The final pH of the resulting calcium complex solution was 7.0.

(3) A calcium complex was prepared as in subpart (1) above except that the amount of lactobionic acid was increased to 35.5 g. The final pH of the resulting calcium complex solution was 4.2.

The calcium complexes prepared in subparts (1)-(3) were evaluated in the same manner as in Examples 2, 3, and 4 above. Performance was essentially the same as the calcium complex as prepared in Example 1.

EXAMPLE 7. A zinc complex was prepared by mixing water (250 g), lactobionic acid (55 g), zinc carbonate (10 g), and citric acid (10 g). The final pH of the solution was about 3.4. A portion of the zinc complex was freeze dried. The freeze dried zinc complex was sufficiently soluble in water such that a clean tasting beverage could be prepared containing 200 percent of the United States Daily Value of zinc.

EXAMPLE 8. A calcium complex of lactobionic acid was prepared as in Example 1 except that lactic acid was used according to the following formulation.

| Ingredient | Weight (g) |
|---|---|
| Water | 400 |
| Lactobionic Acid | 60 |
| Calcium Hydroxide | 10 |
| Lactic Acid (85%) | 9 |

The resulting calcium complex solution had a final pH of about 4.7. A portion of the calcium complex was freeze dried. It exhibited good solubility in water.

Figure 1:
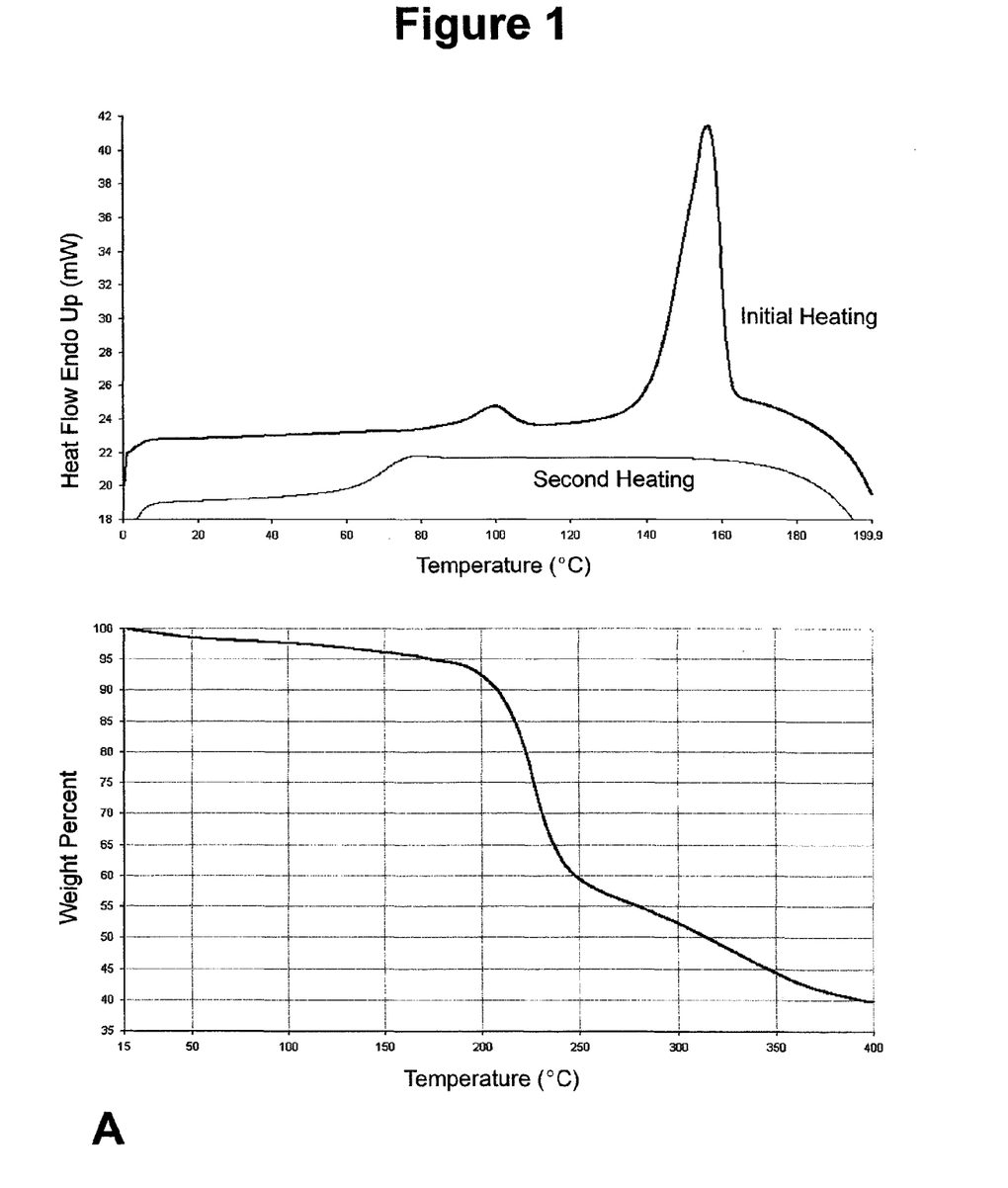
FIG. 1 shows the Differential Scanning Calorimetry results (top portion of each panel) and the Thermal Gravimetric Analysis results (bottom portion of each panel) forcrystalline calcium salt of lactobionic acid (Panel A), crystalline citric acid (Panel B), a mixture of crystalline calcium salt of lactobionic acid and crystalline citric acid (Panel C), and an inventive calcium lactobionic acid complex (Panel D).

EXAMPLE 9. Differential Scanning Calorimeter and Thermal Gravimetric Analyst of (A) crystalline calcium salt of lactobionic acid, (B) crystalline citric acid, (C) a mixture of crystalline calcium salt of lactobionic acid and crystalline citric acid, and (D) an inventive calcium lactobionic acid complex as prepared in Example 1 above. The results are shown in FIG. 1 wherein for each Panel the Differential Scanning Calorimetry is on the top and the Thermal Gravimetric Analysis is on the bottom. The results obtained shown that the inventive calcium lactobionic acid complex (Panel D) is very different from the calcium salt of lactobionic acid (Panel A), citric acid (Panel B), or mixtures thereof (Panel C).

While the invention has been particularly described with specific reference to particular process and product embodiments, it will be appreciated that various alterations and modifications may be based on the present disclosure, and are intended to be within the spirit and scope of the present invention as defined by the following claims.

What is claimed is:

1. A water soluble mineral complex of lactobionic acid and mineral metal divalent or multivalent ion, the mineral complex of lactobionic acid comprising lactobionic acid, a mineral metal ion source, and an edible acid, wherein the mineral complex of lactobionic acid provides more dissolved mineral metal ion at room temperature than the corresponding salt of the same mineral metal ion and lactobionic acid per unit volume of water and wherein the mineral complex of lactobionic acid is prepared by mixing about 50 to about 90 percent source of lactobionic acid and about 2 to about 20 percent of the edible acid in an aqueous solution to provide an aqueous edible acid blend and mixing the edible acid blend with about 5 to about 25 percent of the water soluble mineral divalent or multivalent metal ion source to provide the mineral complex of lactobionic acid which includes a mineral metal ion and wherein the mineral complex of lactobionic acid can be incorporated in a food or beverage product to provide about 5 to about 200 percent of the current recommended United States Daily Value of mineral metal per single serving size of the food or beverage product.

2. The water soluble mineral complex of lactobionic acid as defined in claim 1, wherein the source of lactobionic acid is selected from the group consisting of lactobionic acid, a lactone of lactobionic acid and mixtures thereof, the water soluble mineral metal ion source is selected from the group consisting of a mineral hydroxide, mineral carbonate, a mineral oxide, and mixtures thereof and the edible acid is selected from the group consisting of citric acid, lactic acid, acetic acid, malic acid, gluconic acid, tartaric acid, fumaric acid, adipic acid, succinic acid, ascorbic acid, phosphoric acid, and mixtures thereof.

3. The water soluble mineral complex of lactobionic acid as defined in claim 1, wherein the mineral metal divalent or multivalent ion is selected from the group consisting of calcium, magnesium, iron, zinc, copper, chromium, selenium, manganese, and mixtures thereof.

4. The water soluble mineral complex of lactobionic acid as defined in claim 1, wherein the source of lactobionic acid is lactobionic acid and the mineral metal is calcium.

5. The water soluble mineral complex of lactobionic acid as defined in claim 2, wherein the source of lactobionic acid is lactobionic acid and the mineral metal is calcium.

6. A mineral-fortified beverage product comprising about 0.2 to about 20 percent of mineral metal complex of lactobionic acid and mineral metal divalent or multivalent ion, the mineral metal complex of lactobionic acid comprising lactobionic acid and a mineral metal ion, wherein the mineral metal complex is prepared by mixing about 50 to about 90 percent source of lactobionic acid, about 5 to about 25 percent mineral metal divalent or multivalent ion source which includes a mineral metal, and about 2 to about 20 percent edible acid in an aqueous solution, the amount of the source of lactobionic acid greater than the amount of the edible acid and the source of lactobionic acid, edible acid and mineral metal ion source are in amounts to effect production of the mineral metal complex of lactobionic acid, wherein the mineral metal complex of lactobionic acid provides more dissolved mineral metal ion at room temperature than the corresponding salt of the same mineral metal ion and lactobionic acid per unit volume of water and wherein the mineral metal complex is incorporated in a food or beverage product to provide about 5 to about 200 percent of a recommended United States Daily Value of the mineral metal per single serving size of the food or beverage product.

7. The mineral-fortified food or beverage product as defined in claim 6, wherein the mineral metal source is selected from the group consisting of a mineral hydroxide, a mineral carbonate, a mineral oxide, or mixtures thereof and the edible acid is selected from the group consisting of citric acid, lactic acid, acetic acid, malic acid, gluconic acid, tartaric acid, fumaric acid, adipic acid, succinic acid, ascorbic acid, phosphoric acid, and mixtures thereof.

8. The mineral-fortified food or beverage product as defined in claim 7, wherein the mineral metal divalent or multivalent ion is selected from the group consist of calcium, magnesium, iron, zinc, copper, chromium, selenium, manganese, and mixtures thereof.

9. The mineral-fortified food or beverage product as defined in claim 8, wherein the mineral metal ion includes calcium.

10. A water soluble mineral complex of lactobionic acid and mineral metal ion, the mineral complex of lactobionic acid comprising lactobionic acid, a water soluble mineral metal divalent or multivalent ion source, wherein the mineral complex of lactobionic acid provides more dissolved mineral metal ion at room temperature than the corresponding salt of the same mineral metal ion and lactobionic acid per unit volume of water and wherein the mineral complex of lactobionic acid is prepared by mixing a source of lactobionic acid and water soluble mineral metal divalent or multivalent ion source and water to provide an aqueous solution and blending an edible acid with the aqueous solution to provide the mineral metal complex of lactobionic acid, the source of lactobionic acid present in an amount greater than the edible acid, the lactobionic acid source, the mineral metal ion source and edible acid being present in amounts to provide a pH which effects the reaction of the lactobionic acid source and mineral metal ion source in water to provide the mineral complex of lactobionic acid.

11. The water soluble mineral complex of lactobionic acid as defined in claim 10, wherein lactobionic acid, the edible acid and lactobionic acid source are present in amounts to effect a pH of from 4.6 to 8.

12. The water soluble mineral complex of lactobionic acid as defined in claim 10 wherein the water soluble mineral metal divalent or multivalent ion source includes calcium hydroxide.

13. The water soluble mineral complex of lactobionic acid as defined in claim 11 wherein the edible acid includes citric acid.

14. A water soluble mineral complex of lactobionic acid and mineral metal ion, the mineral complex of lactobionic acid comprising lactobionic acid, a water soluble mineral divalent or multivalent ion source, wherein the mineral complex of lactobionic acid is prepared by mixing a source of lactobionic acid, an edible acid and water soluble mineral metal divalent or multivalent ion source in water to provide the mineral metal complex of lactobionic acid, the source of lactobionic acid present in an amount greater than the edible acid, the lactobionic acid source, the mineral metal ion source and edible acid being present in amounts to provide a pH which effects the reaction of the lactobionic acid source and mineral metal ion source in water to provide the mineral complex of lactobionic acid which is effective to provide more dissolved mineral metal ion at room temperature than the corresponding salt of the same metal ion and lactobionic acid per unit volume of water.

15. The water soluble mineral complex of lactobionic acid as defined in claim 14, wherein lactobionic acid, the edible acid and lactobionic acid source are present in amounts to effect a pH of from 4.6 to 8.

16. A water soluble calcium complex of lactobionic acid and calcium ion, the calcium complex of lactobionic acid comprising lactobionic acid, a calcium ion source, and an edible acid, wherein the calcium complex of lactobionic acid is prepared by mixing about 50 to about 90 percent source of lactobionic acid, about 5 to about 25 percent water soluble calcium ion source, about 2 to about 20 percent edible acid and water to provide an aqueous solution of the calcium mineral complex of lactobionic acid, the source of lactobionic acid present in an amount greater than the edible acid, the lactobionic acid source, the calcium ion source and edible acid being present in amounts to provide a pH of 4.6 to 8 and which effects the reaction of the lactobionic acid source and calcium ion source in water to provide the calcium complex of lactobionic acid which calcium complex provides more dissolved calcium ion at room temperature than the corresponding calcium salt of lactobionic acid per unit volume of water.

17. A method of making a calcium rich beverage, the method comprising:
blending about 50 to about 90 percent lactobionic acid source, water, about 5 to about 25 percent calcium ion source, and about 2 to about 20 percent edible acid, the source of lactobionic acid present in an amount greater than the edible acid, the lactobionic acid source, the calcium ion source and edible acid being present in amounts to provide a pH of 4.6 to 8 and which effects the reaction of the lactobionic acid source and calcium ion source in the water to provide a solution of the calcium complex of lactobionic acid;
drying the solution of the calcium complex of lactobionic acid to provide the calcium complex of lactobionic acid, and which calcium complex is effective to provide more dissolved calcium ion than a corresponding amount of the corresponding calcium salt of lactobionic acid per unit volume of water; and
dissolving the calcium complex into a beverage formulation to provide the calcium rich beverage.

18. The method of claim 17, wherein lactobionic acid, the edible acid and lactobionic acid source are present in amounts to effect a pH of from 4.6 to 8.

* * * * *